United States Patent
Lee et al.

(10) Patent No.: US 10,818,884 B2
(45) Date of Patent: Oct. 27, 2020

(54) POUCH-TYPE SECONDARY BATTERY INCLUDING POUCH CASE WITH CONCAVE GROOVE HAVING BOTTOM SURFACE WITH AREA LARGER THAN OPENING AREA OF CONCAVE GROOVE AND POUCH FILM FORMING APPARATUS

(71) Applicant: LG CHEM, LTD., Seoul (KR)

(72) Inventors: Jung-Pil Lee, Daejeon (KR); Eun-Bee Kim, Daejeon (KR); Ji-Young Kim, Daejeon (KR); Eun-Kyung Mok, Daejeon (KR); Hye-Ri Jung, Daejeon (KR)

(73) Assignee: LG Chem, Ltd. (KR)

( * ) Notice: Subject to any disclaimer, the term of this patent is extended or adjusted under 35 U.S.C. 154(b) by 113 days.

(21) Appl. No.: 16/078,764

(22) PCT Filed: Nov. 21, 2017

(86) PCT No.: PCT/KR2017/013286
§ 371 (c)(1),
(2) Date: Aug. 22, 2018

(87) PCT Pub. No.: WO2018/131788
PCT Pub. Date: Jul. 19, 2018

(65) Prior Publication Data
US 2019/0051868 A1 Feb. 14, 2019

(30) Foreign Application Priority Data

Jan. 11, 2017 (KR) .................. 10-2017-0004339

(51) Int. Cl.
*H01M 2/02* (2006.01)
*H01M 10/04* (2006.01)
*H01M 10/647* (2014.01)

(52) U.S. Cl.
CPC ....... *H01M 2/0275* (2013.01); *H01M 2/0212* (2013.01); *H01M 2/0267* (2013.01);
(Continued)

(58) Field of Classification Search
CPC ............. H01M 2/0275; H01M 2/0212; H01M 2/0267; H01M 2/0277; H01M 2/0287; H01M 10/0404; H01M 10/0413
(Continued)

(56) References Cited

U.S. PATENT DOCUMENTS

2009/0023058 A1* 1/2009 Kim .................... H01M 2/0207
429/131
2013/0084484 A1* 4/2013 Shinyashiki ........ H01M 2/0212
429/153
(Continued)

FOREIGN PATENT DOCUMENTS

CN 104669596 A * 6/2015
CN 209029476 U 6/2019
(Continued)

OTHER PUBLICATIONS

International Search Report issued in PCT/KR2017/013286 (PCT/ISA/210), dated Feb. 27, 2018.
Chinese Search Report for Application No. 201780015360.0 dated Jan. 21, 2020, one page.

*Primary Examiner* — Sean P Cullen
(74) *Attorney, Agent, or Firm* — Lerner, David, Littenberg, Krumholz & Mentlik, LLP (57) ABSTRACT

Disclosed is a pouch-type secondary battery, which includes an electrode assembly having a positive electrode plate and a negative electrode plate disposed to face each other and a pouch case having a concave groove formed to accommodate the electrode assembly, wherein the pouch case includes a first pouch film and a second pouch film thermally fused to the first pouch film, and wherein a concave groove is (Continued)

formed in at least one of the first pouch film and the second pouch film, and the concave groove has a bottom surface on which the electrode assembly is placed so that the bottom surface has an area equal to or greater than an area of a reference surface that covers an opening of the concave groove.

6 Claims, 6 Drawing Sheets

(52) U.S. Cl.
CPC ....... *H01M 2/0277* (2013.01); *H01M 2/0287* (2013.01); *H01M 10/0404* (2013.01); *H01M 10/0413* (2013.01); *H01M 10/647* (2015.04)

(58) Field of Classification Search
USPC ........................................................ 429/163
See application file for complete search history.

(56) References Cited

U.S. PATENT DOCUMENTS

| | | |
|---|---|---|
| 2016/0093839 A1 | 3/2016 | Iseri et al. |
| 2020/0083493 A1 | 3/2020 | Lee |

FOREIGN PATENT DOCUMENTS

| | | | |
|---|---|---|---|
| DE | 102013201351 A1 | | 7/2014 |
| EP | 1901365 A1 | | 3/2008 |
| JP | 2000200584 A | * | 7/2000 |
| JP | 2004055171 A | * | 2/2004 |
| JP | 2010192154 A | * | 9/2010 |
| KR | 10-2002-0070552 A | | 9/2002 |
| KR | 10-2013-0131522 A | | 12/2013 |
| KR | 10-2014-0005614 A | | 1/2014 |
| KR | 10-1384901 B1 | | 4/2014 |
| KR | 10-1477018 B1 | | 12/2014 |
| KR | 20-2015-0003358 A | | 9/2015 |

* cited by examiner

FIG. 1

PRIOR ART

FIG. 2

PRIOR ART

POUCH-TYPE SECONDARY BATTERY INCLUDING POUCH CASE WITH CONCAVE GROOVE HAVING BOTTOM SURFACE WITH AREA LARGER THAN OPENING AREA OF CONCAVE GROOVE AND POUCH FILM FORMING APPARATUS

TECHNICAL FIELD

The present disclosure relates to a pouch-type secondary battery, and more particularly, to a pouch-type secondary battery having an increased energy density by reducing a dead space and an apparatus for forming a pouch film that is used for the pouch-type secondary battery.

The present application claims priority to Korean Patent Application No. 10-2017-0004339 filed on Jan. 11, 2017 in the Republic of Korea, the disclosures of which are incorporated herein by reference.

BACKGROUND ART

Recently, the interest in electric products that may be operated by using electric energy is increasing. Accordingly, as technology development and demand for electric products are increasing, the demand for secondary batteries as energy sources is rapidly increasing, in more diverse forms. Thus, a lot of researches on secondary batteries are being carried out in order to meet various demands.

Secondary batteries are classified into pouch-type secondary batteries, cylindrical secondary batteries, rectangular secondary batteries and the like depending on the type of their exteriors, among which the pouch-type secondary battery is a secondary battery in which an electrode assembly is included in a pouch case made of metal laminate sheets. The pouch-type secondary battery has advantages in that it may be easily manufactured with a low manufacturing cost and also it is easily to configure a battery pack having a large capacity by connecting a plurality of unit cells in series and/or in parallel.

For example, a single cup-type pouch-type secondary battery includes a pouch case made of aluminum laminate sheets and an electrode assembly accommodated in the pouch case and having a plurality of stacked electrochemical cells, each having a positive electrode, a separator and a negative electrode.

Figure 1:
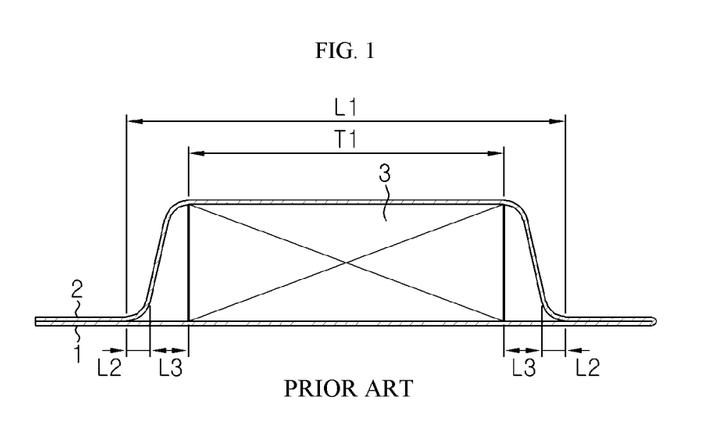
FIG. 1 is a schematic cross-sectional view showing a conventional pouch-type secondary battery.
Figure 2:
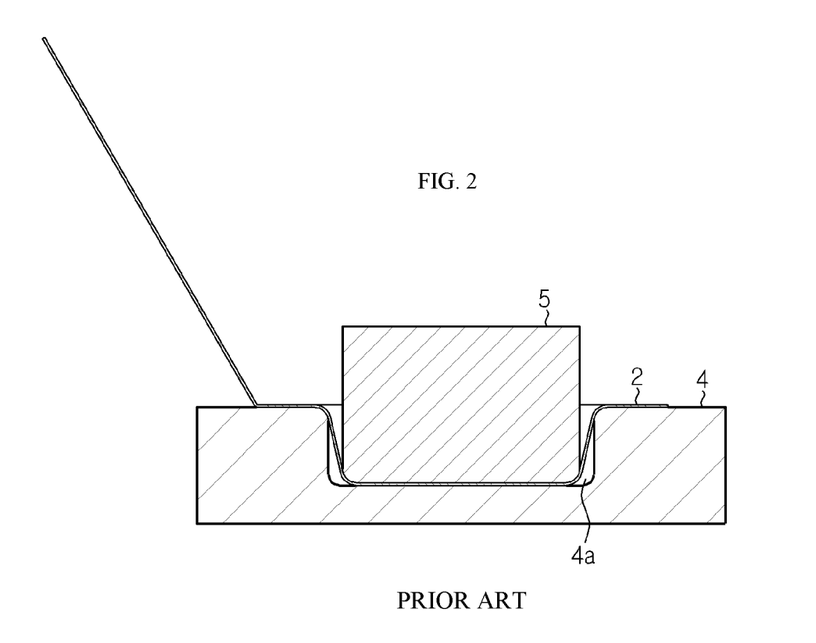
FIG. 2 is a diagram for illustrating a forming process in which the conventional pouch film forming apparatus forms a concave groove in a pouch film.

FIG. 1 is a schematic cross-sectional view showing a conventional pouch-type secondary battery, and FIG. 2 is a diagram for illustrating a forming process in which the conventional pouch film forming apparatus forms a concave groove in a pouch film.

Referring to FIG. 1, the pouch case includes a lower pouch film 1 and an upper pouch film 2. Also, the upper pouch film 2 has a concave groove in which an electrode assembly 3 may be placed. The concave groove is formed at the upper pouch film 2 corresponding to the shape of the electrode assembly 3, and the depth of the concave groove is determined depending on the thickness of the electrode assembly 3.

Referring to FIG. 2, the conventional pouch film forming apparatus includes a die 4 and a punch 5. A forming groove 4a is formed at the die 4 with a shape corresponding to a desired pouch case that is formed by using the pouch film 2. At this time, the forming groove 4a has a depth corresponding to a depth of a concave groove to be formed in the demanded pouch case. In addition, the punch 5 is used to place the pouch film 2 on the die 4 and apply a force thereto, namely press, in order to form a pouch case having a concave groove with a desired depth by using the pouch film 2.

However, since the diameter of the forming groove 4a of the die 4 is larger than the diameter of the punch 5, the concave groove of the pouch film 2 is not formed completely in conformity with the forming groove 4a of the die. That is, due to the difference in size between the forming groove 4a and the punch 5 and the somewhat flexible property of the pouch film 2, in the forming process, the side surface of the pouch film 2 is shaped obliquely, in a spaced state, to the sidewall of the forming groove. Thus, if the side surface of the pouch film is formed obliquely as above, the area of the bottom surface of the concave groove is reduced. For example, as shown in FIG. 1, assuming that the full width of the reference surface of the concave groove is L1, the full width of the bottom surface is L1−2×(L2+L3), which is smaller than the reference surface of the concave groove.

However, since the size of the electrode assembly capable of being accommodated in the pouch case is related to the area of the bottom surface of the concave groove, the reduction of the area of the bottom surface of the concave groove is disadvantageous to the energy density. Recently, a battery pack having a high energy density and a compact design have been actively researched and developed. In order to implement such a battery pack, it is pointed out that an energy density should be improved more than a conventional technology in view of a secondary battery cell unit. Thus, it is required to increase the energy density by reducing a dead space in the internal space of the conventional pouch-type secondary battery.

DISCLOSURE

Technical Problem

The present disclosure is designed in view of the above conventional technique, and the present disclosure is directed to providing a pouch-type secondary battery, which is capable of increasing an energy density by accommodating a higher capacity electrode assembly, compared to the conventional technique, by reducing a dead space inside a pouch case, and an apparatus for forming a pouch film used for the pouch-type secondary battery.

Technical Solution

In one aspect of the present disclosure, there is provided a pouch-type secondary battery, which includes an electrode assembly having a positive electrode plate and a negative electrode plate disposed to face each other and a pouch case having a concave groove formed to accommodate the electrode assembly, wherein the pouch case includes a first pouch film and a second pouch film thermally fused to the first pouch film, and wherein a concave groove is formed in at least one of the first pouch film and the second pouch film, and the concave groove has a bottom surface on which the electrode assembly is placed so that the bottom surface has an area equal to or greater than an area of a reference surface that covers an opening of the concave groove.

The concave groove may include a first side surface region in which a full width of the concave groove is gradually decreased along the depth from the reference surface and a second side surface region in which the full width of the concave groove is gradually increased from an end point of the first side surface region to the bottom surface.

The first side surface region may have a rounded shape.

A full width of the electrode assembly may correspond to the full width of the concave groove at the end point of the first side surface region.

The concave groove may be formed at the first pouch film.

The first pouch film and the second pouch film may be formed using a single film, and the second pouch film may be disposed to overlap the first pouch film to form a single cup-type pouch case.

In another aspect of the present disclosure, there is also provided a pouch film forming apparatus for forming the pouch case having the concave groove, the apparatus comprising: a die configured to form a forming groove with a shape corresponding to the concave groove and having a first die unit and a second die unit provided to relatively move in a horizontal direction; and a punch configured to move into or out of the forming groove and provided to closely adhere a concave groove target of the pouch film to a surface of the forming groove by means of air pressure before a forming process.

A top surface of the second die unit on which the pouch film is placed may be relatively wider than the first die unit.

The punch may have a plurality of air discharge holes capable of injecting a compressed air outwards.

The punch may be made of soft material that is shrinkable and expandable according to the injection of air.

Advantageous Effects

According to an embodiment of the present disclosure, it is possible to provide a pouch-type secondary battery capable of increasing an energy density by accommodating a higher capacity electrode assembly by reducing a dead space inside the pouch case.

According to another embodiment of the present disclosure, it is possible to provide a pouch film forming apparatus capable of forming a pouch film having a concave groove whose bottom surface on which the electrode assembly may be placed is at least equal to or greater than a reference surface that covers an opening of the concave groove of the pouch film.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 3:
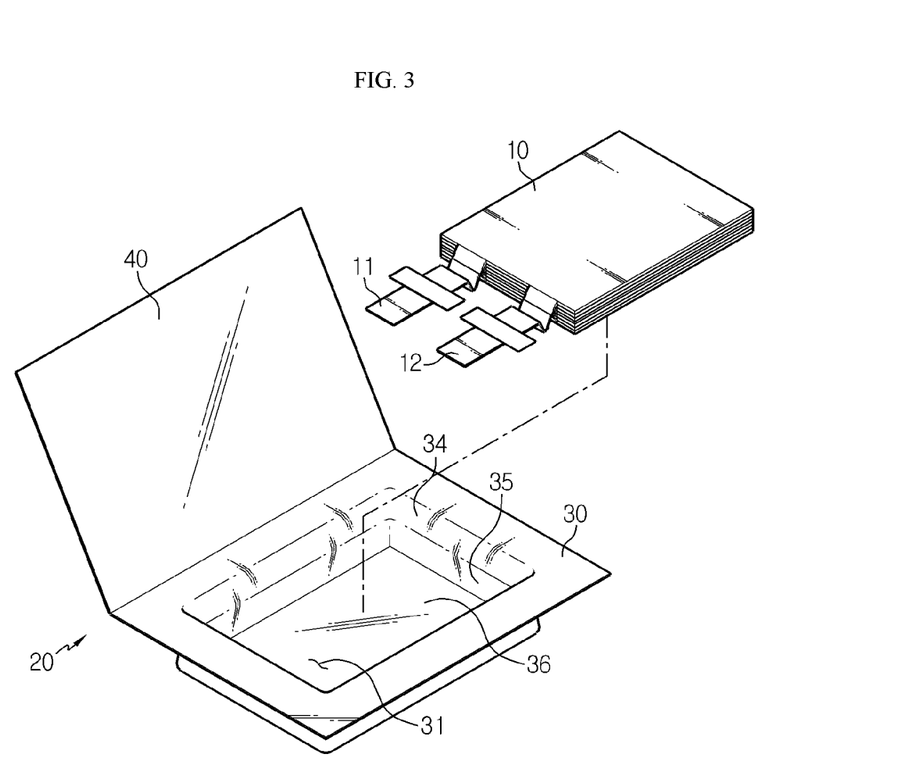
FIG. 3 is a perspective view schematically showing a pouch case according to an embodiment of the present disclosure.
Figure 4:
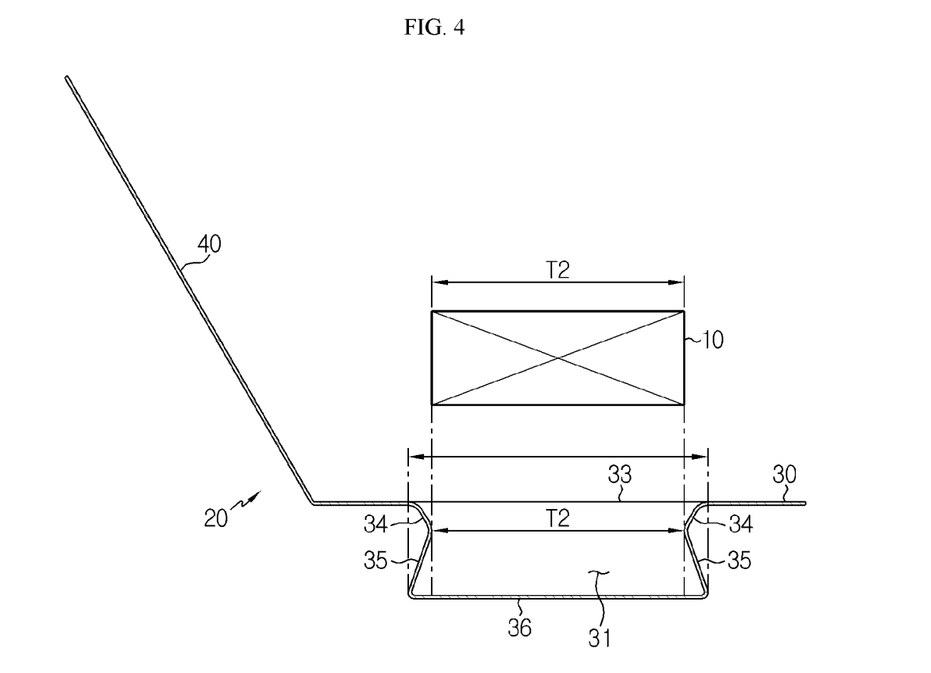
FIG. 4 is a schematic cross-sectional view showing the pouch case and the electrode assembly of FIG. 3.

Referring to FIGS. 3 and 4, a pouch-type secondary battery according to an embodiment of the present disclosure includes an electrode assembly 10, and a pouch case 20 composed of a first pouch film 30 having a concave groove 31 capable of accommodating the electrode assembly 10 and a second pouch film 40 capable of being thermally fused to the first pouch film 30 in a vertical direction.

As will be explained in more detail below, the pouch case 20 according to the present disclosure has the same full width as a conventional pouch case 20, but may further ensure an internal space in which the electrode assembly 10 may be effectively accommodated. Thus, based on the same specification, the pouch-type secondary battery according to the present disclosure has a higher energy density because it may accommodate the electrode assembly 10 with a larger capacity in comparison to a conventional pouch-type secondary battery. If the pouch-type secondary batteries according to the present disclosure are used, it is possible to design a more compact battery pack, compared to a conventional one.

First, the electrode assembly 10 of the pouch-type secondary battery according to the present disclosure will be briefly described. Though not shown in detail for the sake of convenience of illustration, the electrode assembly 10 may include a positive electrode plate and a negative electrode plate which are disposed to face each other. The positive electrode plate and the negative electrode plate are formed by coating a current collector with active material slurry. The slurry is usually formed by stirring a solvent in which a granular active material, an auxiliary conductor, a binder, a plasticizer and the like are added.

The positive electrode plate and the negative electrode plate are provided in a plate form and are disposed to be spaced apart so that their plates face each other. A separator is interposed between the positive electrode plate and the negative electrode plate so that the positive electrode plate and the negative electrode plate are not in direct contact with each other. The separator has a porous structure so that the positive electrode plate and the negative electrode plate are blocked not to be short-circuited allow charge transfer during charging or discharging.

An electrode lead may be attached to the electrode assembly 10, and the electrode lead may be exposed out of the pouch case 20 to serve as an electrode terminal that may be electrically connected to another secondary battery or an external device. The electrode lead may be coupled with an electrode tab that is directly connected to the electrode assembly 10. Here, at least one positive electrode tab and at least one negative electrode tab may be coupled with a positive electrode lead 11 and a negative electrode lead 12, respectively.

The pouch case 20 may include an outer insulating layer made of a polymer material, an inner adhesive layer, and a metal layer interposed between the outer insulating layer and the inner adhesive layer. Here, the metal layer may be made of any one selected from the group consisting of iron, carbon, an alloy of chromium and manganese, an alloy of iron, chromium and nickel, and aluminum or equivalents thereof, and the aluminum metal foil is widely used. The pouch case 20 protects the electrode assembly 10 and internal components such as the electrolyte, and performs the function of complementing electrochemical properties of the electrode assembly 10 and the electrolyte and dissipating heat therefrom.

As shown in FIG. 3, the pouch case 20 according to this embodiment includes a first pouch film 30 and a second pouch film 40, whose edges may be overlapped with each other. The first pouch film 30 and the second pouch film 40 are formed using a single film, and the first pouch film 30 has a concave groove 31 formed using a forming process so that the electrode assembly 10 may be placed therein. The second pouch film 40 is disposed to overlap the first pouch film 30 to form a single cup-type pouch case 20.

In this embodiment, the concave groove 31 is formed only in the first pouch film 30, but a concave groove 31 of the same shape may also be formed in the second pouch film 40. That is, by forming the concave groove 31 in both the first pouch film 30 and the second pouch film 40, it is possible to accommodate a thicker electrode assembly 10 than the electrode assembly 10 of this embodiment. In addition, the first pouch film 30 and the second pouch film 40 may be separately prepared and be thermally fused in a vertical direction.

Figure 5:
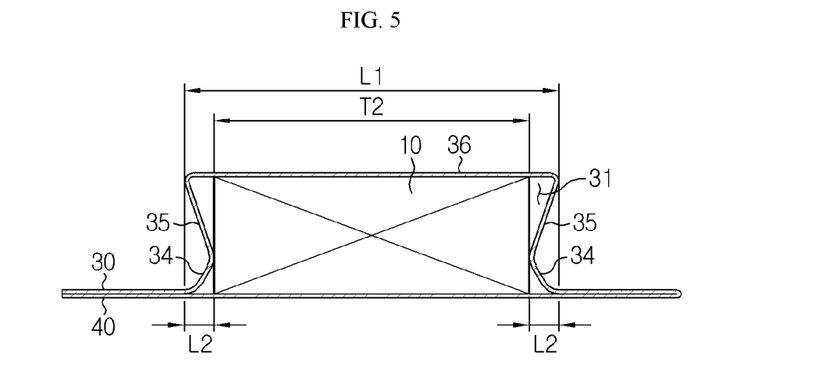
FIG. 5 is a schematic cross-sectional view showing that the electrode assembly is accommodated in the pouch case of FIG. 3 and then the pouch case is sealed.
Figure 6:
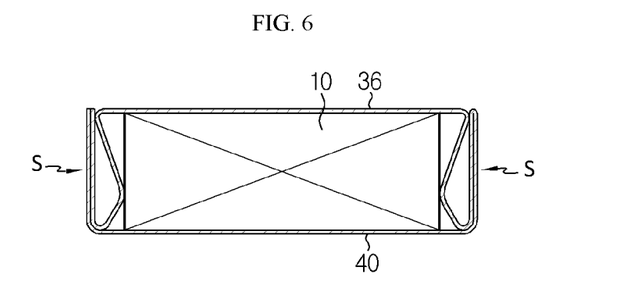
FIG. 6 is a schematic cross-sectional view showing the pouch-type secondary battery of FIG. 5 that is vertically reversed after the sealing portion is folded.

FIG. 5 is a schematic cross-sectional view showing that the electrode assembly is accommodated in the pouch case of FIG. 3 and then the pouch case is sealed, and FIG. 6 is a schematic cross-sectional view showing the pouch-type secondary battery of FIG. 5 that is vertically reversed after the sealing portion is folded.

Referring to FIGS. 4 to 6, a bottom surface 36 of the concave groove 31 on which the electrode assembly 10 is capable of being placed may have an area equal to or greater than an area of a reference surface 33 that covers an opening of the concave groove 31. Here, the reference surface 33 may be understood as a surface corresponding to one surface of the second pouch film 40 that covers the opening of the concave groove 31.

For reference, the single cup-type pouch case 20 has a sealing portion S formed by disposing the second pouch film 40 to overlap the first pouch film 30 and then thermally fusing their terrace portions, namely their outer rim portions that overlap each other. As shown in FIG. 6, the sealing portion S may be folded toward the electrode assembly 10. At this time, the full width of the pouch-type secondary battery may be approximately equal to the full width of the reference surface 33.

Referring to FIGS. 4 and 5 again, the concave groove 31 has a first side surface region 34 in which the full width of the concave groove 31 is gradually decreased along the depth from the reference surface 33 and a second side surface region 35 the full width of the concave groove 31 is gradually increased from an end point of the first side surface region 34 to the bottom surface 36 of the concave groove 31 that is a deepest place.

The first side surface region 34 has a rounded shape. In other words, the first side surface region 34 is a portion that forms a top of the concave groove 31, and may be concavely recessed toward the electrode assembly 10 when the pouch case 20 is viewed from the side.

By providing the first side surface region 34 in the concave groove 31 of the first pouch film 30, it is possible to prevent stress from concentrating on the corresponding portion. In other words, if the pouch film reaches the softness limit of the materials of the metal layer and the insulating layer during the foaming process, the pouch film may be torn without being able to withstand the stress caused by the foaming. In particular, a top edge of the concave groove 31 is vulnerable to stress even after forming. Thus, in the present disclosure, by providing the first side surface region 34 formed in a rounded shape, the stress may not concentrate but be dispersed at the top edge of the concave groove 31. The first side surface region 34 may correspond to a curvature R of an edge portion of a die 100 of a pouch film forming apparatus, explained later.

Meanwhile, it is desirable that the first side surface region 34 is relatively very short compared to the second side surface region 35 in view of the space efficiency inside the pouch case 20. In this embodiment, the first side surface region 34 is formed in the concave groove 31, but the first side surface region 34 may be not formed at the concave groove 31. That is, the concave groove 31 may form the second side surface region 35 having an increasing full width directly from the reference surface 33, without the first side surface region 34.

The second side surface region 35 may be a region that determines the depth of the concave groove 31. That is, the second side surface region 35 may correspond approximately to the thickness of the electrode assembly 10. The second side surface region 35 is formed so that the full width of the concave groove 31 is gradually increased along the depth of the concave groove 31, namely along a depression direction. The end point of the second side surface region 35 is connected to four edges of the bottom surface 36 of the concave groove 31. Thus, the width of the bottom surface 36 of the concave groove 31 may be determined by the slope or length of the second side surface region 35. In this embodiment, the second side surface region 35 is formed so that the bottom surface 36 of the concave groove 31 is identical to the reference surface 33 of the concave groove 31.

If the bottom surface 36 of the concave groove 31 is equal to the reference surface 33 of the concave groove 31 as in the present disclosure, it is possible that an electrode assembly 10, which is larger than the conventional electrode assembly 10 (see FIG. 1), is placed in the concave groove 31.

More specifically, referring to FIGS. 1 and 5, a conventional pouch-type secondary battery and a pouch-type secondary battery according to the present disclosure having the same full width of L1 will be compared. In the conventional pouch-type secondary battery, the full width (L1) is the sum of a total width (T1) of the conventional electrode assembly 10, a full width (2×L3) of a dead space and a full width (2×L2) of the stress relaxed region. Meanwhile, in the pouch-type secondary battery according to the present disclosure, the full width (L1) is the sum of a full width (T2) of the electrode assembly 10 and a full width (2×L2) of the first side surface region 34.

In summary, the following relation is established between the conventional pouch-type secondary battery and the pouch-type secondary battery according to an embodiment of the present disclosure.

$$L1=T1+(2\times L3)+(2\times L2)=(T2)+(2\times L2)$$

Thus, in the present disclosure, it may be understood that even though the full width of the pouch case is the same, an electrode assembly 10 larger than the electrode assembly 10 capable of being accommodated in the conventional pouch case 20 may be accommodated.

As described above, the pouch case 20 according to the present disclosure is formed such that the bottom surface 36 of the concave groove 31 is formed identical to the reference surface 33, and thus it is possible that the electrode assembly 10 having a full width corresponding to the full width of the concave groove 31 at least at the end point of the first side surface region 34 may be accommodated, which may increase the energy density of the pouch-type secondary battery.

Hereinafter, referring to FIGS. 7 to 10, a pouch film forming apparatus for forming the pouch case 20 will be described.

FIGS. 7 to 10 are diagrams for illustrating a forming process in which the pouch film forming apparatus according to an embodiment of the present disclosure forms the concave groove 31 in a pouch film.

A pouch film forming apparatus according to an embodiment of the present disclosure includes a die 100 composed of a first die unit 120 and a second die unit 130, which are provided to be relatively movable in a horizontal direction to form the forming groove 110 with a shape corresponding to the concave groove 31, and a punch 200 configured to move into or out of the forming groove 110 and to closely adhere a concave groove target 30a of the pouch film to the surface of the forming groove 110 by means of air pressure before the forming process.

The die 100 is a metallic structure having the forming groove 110 with the same shape as the concave groove 31 of the pouch film and serves as a mold. In particular, the first die unit 120 and the second die unit 130 constituting the die 100 according to the present disclosure are provided to be relatively movable in the horizontal direction. Alternatively, it is also possible that any one of the first die unit 120 and the second die unit 130 is moved with respect to the other or both of them are horizontally moved relative to each other.

The first die unit 120 and/or the second die unit 130 may be moved relative to each other using, for example, a linear motion (LM) guide (not shown) as a moving means of the die 100. Also, any driving device may be used as long as it is able to move the first die unit 120 and the second die unit 130 relative to each other.

In the present disclosure, the first die unit 120 and the second die unit 130 are relatively moved in the horizontal direction, so that the pouch film may be easily pulled out from the forming groove 110 of the die 100 while maintaining its formed shape after the forming process.

In addition, the top surface of the second die unit 130 on which the pouch film is placed may be relatively larger than the first die unit 120. In the single cup-type pouch case 20, the first pouch film 30 and the second pouch film 40 are integrally formed so that their one side edges are connected to each other. For better manufacture of the single cup-type pouch case 20, the second die unit 130 may be made wider than the top surface of the first die unit 120 to support the second pouch film 40 when the concave groove 31 is formed in the first pouch film 30.

The punch 200 according to this embodiment is provided to be movable up and down with respect to the forming groove 110 of the die 100 so that the concave groove target 30a of the pouch film placed on the die 100 is pressed into the forming groove 110. In particular, in this embodiment, a plurality of air discharge holes 210 for spraying a compressed air from the inside to the outside are provided at a lower end of the punch 200, so that the pouch film may be closely adhered to the surface of the forming groove 110 by air pressure.

Meanwhile, a corner portion of the forming groove 110 of the die 100 and a corner portion of the punch 200 are rounded to have a predetermined curvature, so that the stress applied to the pouch film during the forming process may be reduced to prevent the pouch film from being damaged.

Hereinafter, the forming process of the pouch case 20 will be briefly described.

Figure 7:
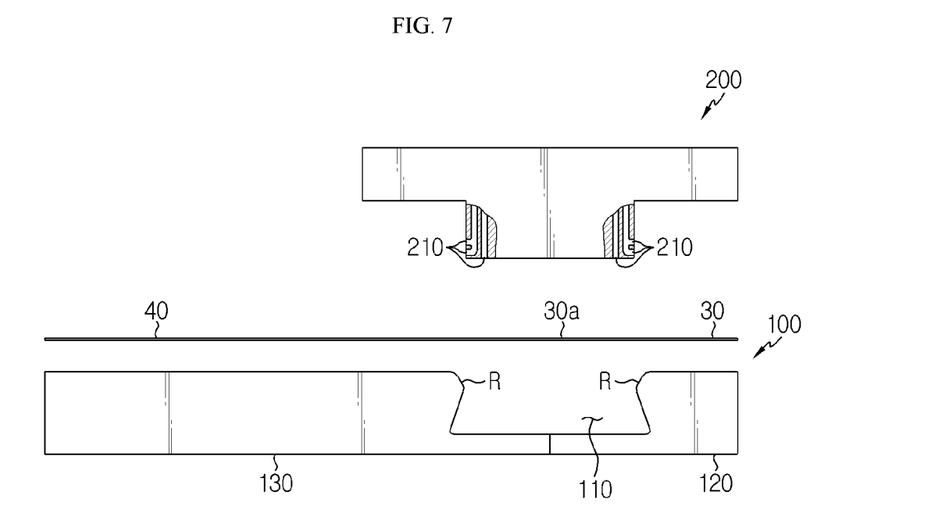
FIGS. 7 to 10 are diagrams for illustrating a forming process in which the pouch film forming apparatus according to an embodiment of the present disclosure forms a concave groove in a pouch film.
Figure 8:
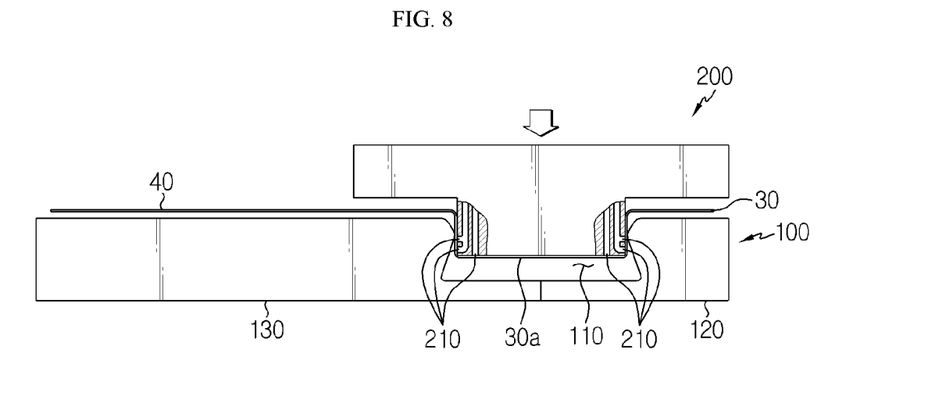

As shown in FIGS. 7 and 8, a pouch film is placed on the die 100, and the concave groove target 30a of the pouch film is pressed using the punch 200. At this time, the concave groove target 30a of the pouch film is brought into contact with the bottom surface 36 of the forming groove 110.

Figure 9:
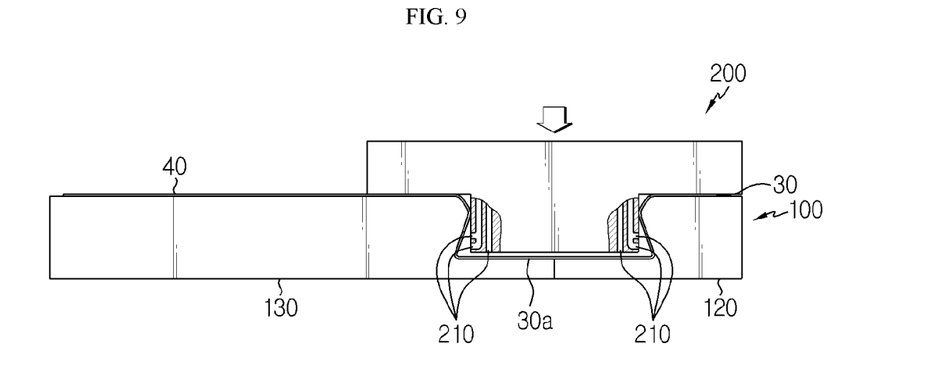

Then, as shown in FIG. 9, an air compressor (not shown) is operated to discharge a compressed air out of the punch 200 through the air discharge holes 210. Accordingly, the pouch film may be closely adhered to the side surface of the forming groove 110. If the pouch film is completely formed, the air compressor stops operating.

Figure 10:
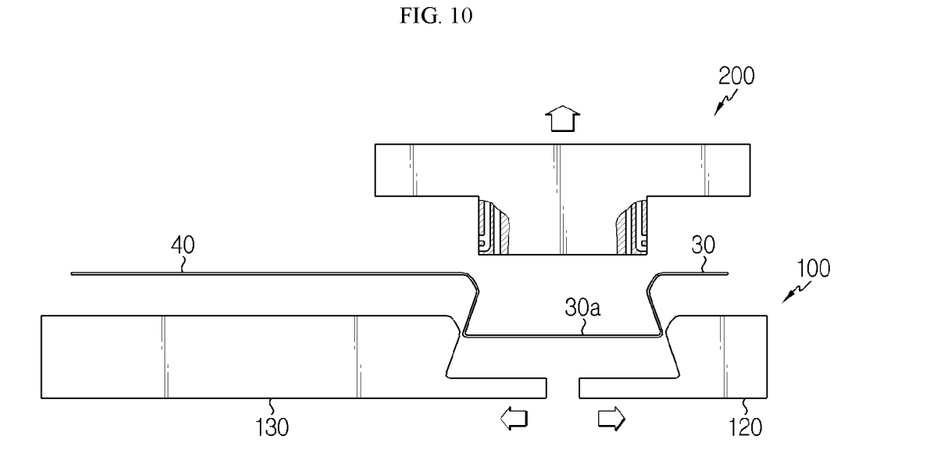

After that, as shown in FIG. 10, the punch 200 is removed from the die 100, and then the first die unit 120 and the second die unit 130 are moved relative to each other such that the formed pouch film may be safely removed from the die 100. Then, the pouch film is completely removed from the die 100 to complete the forming process.

According to the pouch film forming apparatus configured as above, the pouch film may be mechanically formed such that the bottom surface 36 of the concave groove 31 has an area equal to or greater than an area of the reference surface 33 of the pouch film.

Hereinafter, a pouch film forming apparatus according to another embodiment of the present disclosure will be described.

Figure 11:
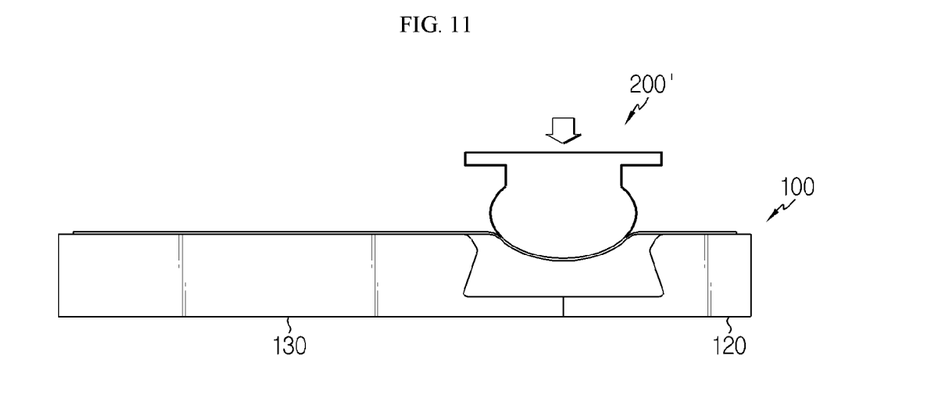
FIGS. 11 and 12 are diagrams for illustrating a forming process in which the pouch film forming apparatus according to another embodiment of the present disclosure forms a concave groove in the pouch film.
Figure 12:
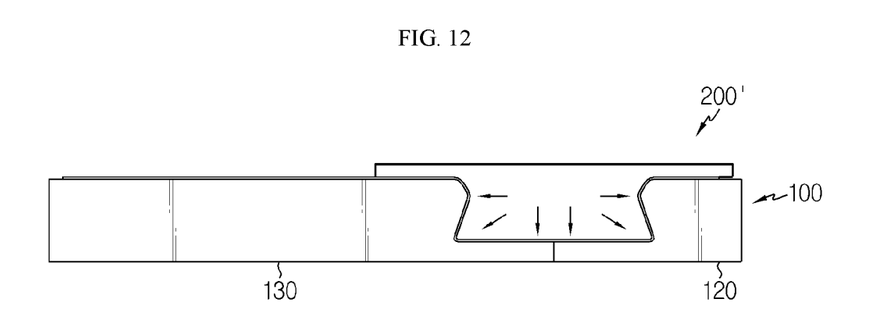

FIGS. 11 and 12 are diagrams for illustrating a forming process in which the pouch film forming apparatus according to another embodiment of the present disclosure forms a concave groove in the pouch film. The same reference numerals as those in the former embodiment denote the same components, and the same components will not be described in detail.

The punch 200' of this embodiment is made of a flexible material capable of shrinking or expanding as air is injected. For example, in this embodiment, the punch 200' is an air bag made of rubber into which air may be injected, and the air bag may be inflated when the air is injected therein.

Thus, as shown in FIG. 11, the pouch film is pushed into the forming groove 110 by pressing the concave groove target 30a using the punch 200' into which a predetermined amount of air is injected. After that, as shown in FIG. 12, if air is injected again in a state where the punch 200' is inserted into the forming groove 110, the punch 200' expands according to the shape of the forming groove 110, so that the concave groove target 30a of the pouch film is closely adhered to the surface of the forming groove 110.

After that, the air is taken out to shrink the punch 200', and then the first die unit 120 and the second die unit 130 are moved relative to each other to pull the pouch film out of the forming groove 110.

In the pouch film forming apparatus according to another embodiment of the present disclosure, the punch 200' is made of a soft material and is thus softer than the punch 200 of the former embodiment that is made of a hard material. Thus, the pouch film is less likely to be damaged during the foaming process. In addition, since the punch 200' made of a soft material inflates inside the forming groove 110 to press the entire concave groove target 30a of the pouch film, the concave groove target 30a is more closely adhered to the forming groove 110 of the pouch film, thereby further improving the forming completeness.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or a shape in which an object is placed.

What is claimed is:

1. A pouch-type secondary battery, which includes an electrode assembly having a positive electrode plate and a negative electrode plate disposed to face each other and a pouch case having a concave groove formed to accommodate the electrode assembly,
    wherein the pouch case includes a first pouch film and a second pouch film thermally fused to the first pouch film,
    wherein the concave groove is formed in at least one of the first pouch film or the second pouch film, and the concave groove has a reference surface that covers an opening of the concave groove and a bottom surface furthest from the reference surface on which the electrode assembly is placed so that the bottom surface has an area equal to or greater than an area of the reference surface, and
    wherein the concave groove includes a first side surface region in which a full width of the concave groove is gradually decreased along a depth of the first side surface region from the reference surface and a second side surface region in which the full width of the concave groove is gradually increased along a depth of the second side surface region from a beginning of the second side surface region adjacent an end point of the first side surface region to the bottom surface.

2. The pouch-type secondary battery according to claim 1, wherein the first side surface region has a rounded shape.

3. The pouch film forming apparatus according to claim 1, wherein the depth of the first side surface region is smaller than the depth of the second side surface region.

4. The pouch-type secondary battery according to claim 1, wherein a full width of the electrode assembly corresponds to the full width of the concave groove at the end point of the first side surface region.

5. The pouch-type secondary battery according to claim 1, wherein the concave groove is formed at the first pouch film.

6. The pouch-type secondary battery according to claim 5, wherein the first pouch film and the second pouch film are formed using a single film, and the second pouch film is disposed to overlap the first pouch film to form a single cup-type pouch case.

* * * * *